Figure 1:
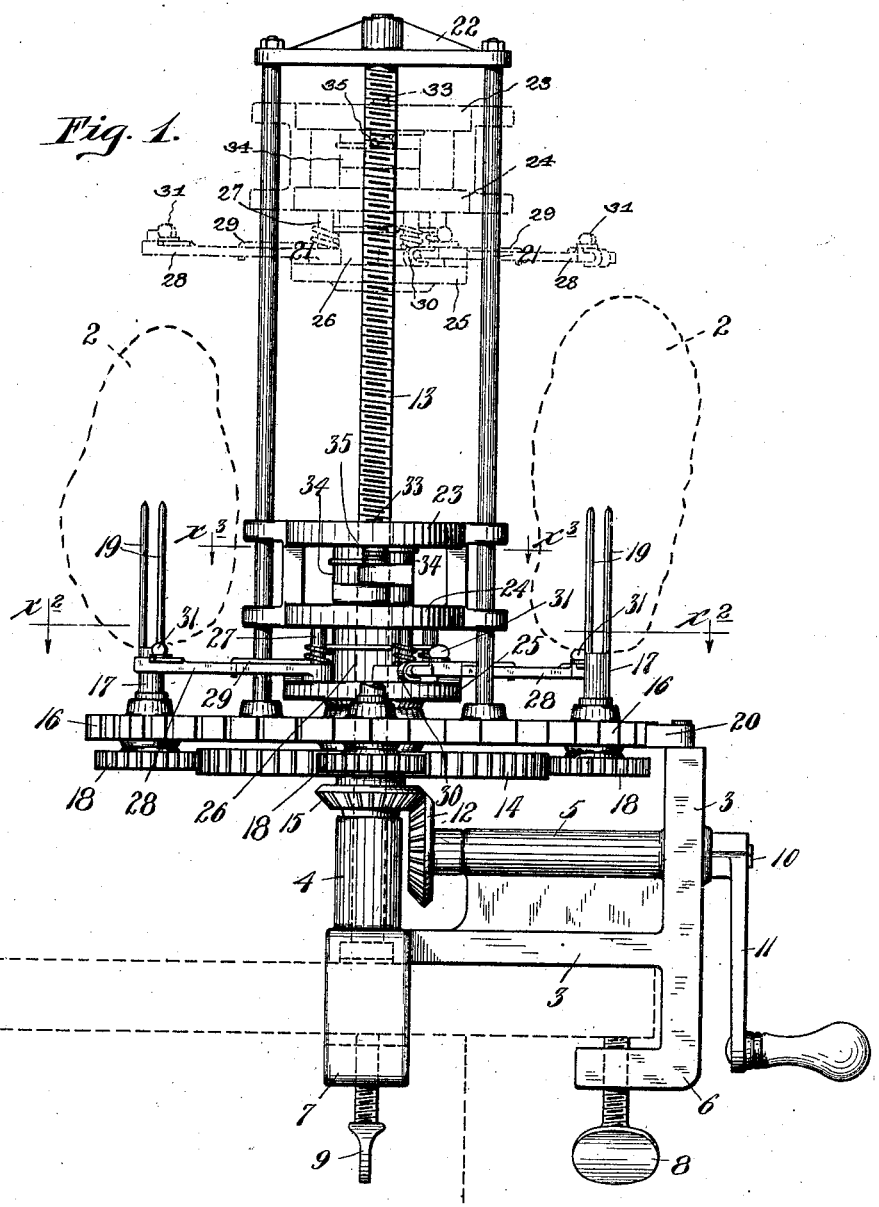

No. 836,140. PATENTED NOV. 20, 1906.
O. P. G. RADSCH.
VEGETABLE PARER.
APPLICATION FILED OCT. 19, 1905.

2 SHEETS—SHEET 1.

Witnesses.
E. W. Jeppesen.
A. H. Opsahl.

Inventor:
Oscar P. G. Radsch.
By his Attorneys.
Williamson Merchant

No. 836,140. PATENTED NOV. 20, 1906.
O. P. G. RADSCH.
VEGETABLE PARER.
APPLICATION FILED OCT. 19, 1905.
2 SHEETS—SHEET 2.
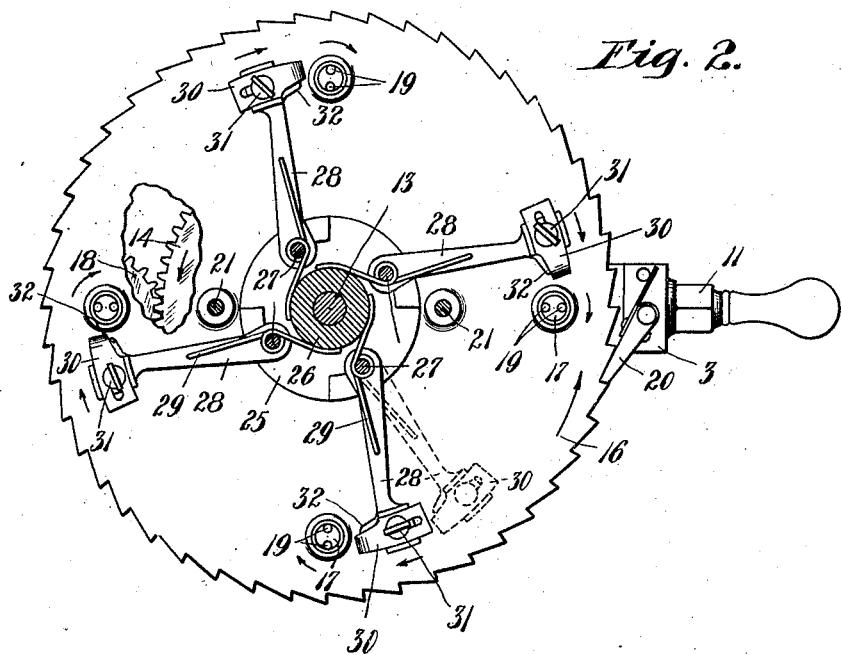
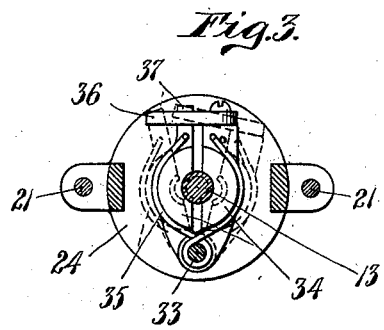
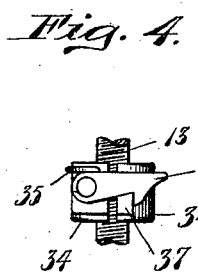
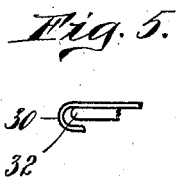
Witnesses.
E. W. Jeppesen.
A. H. Opsahl.
Inventor.
Oscar P. G. Radsch.
By his Attorneys.
Williamson Merchant

UNITED STATES PATENT OFFICE.

OSCAR P. G. RADSCH, OF MINNEAPOLIS, MINNESOTA.

VEGETABLE-PARER.

No. 836,140.     Specification of Letters Patent.     Patented Nov. 20, 1906.

Application filed October 19, 1905. Serial No. 283,439.

*To all whom it may concern:*

Be it known that I, OSCAR P. G. RADSCH, a citizen of the United States, residing at Minneapolis, in the county of Hennepin and State of Minnesota, have invented certain new and useful Improvements in Vegetable-Parers; and I do hereby declare the following to be a full, clear, and exact description of the invention, such as will enable others skilled in the art to which it appertains to make and use the same.

My invention has for its object to provide an improved vegetable and fruit parer; and to this end it consists of the novel devices and combinations of devices hereinafter described, and defined in the claims.

The invention is illustrated in the accompanying drawings, wherein like characters indicate like parts throughout the several views.

Figure 1 is a view in side elevation showing the improved device in operative position. Fig. 2 is a horizontal section taken on the line $x^2$ $x^2$ of Fig. 1. Fig. 3 is a detail in horizontal section taken on the line $x^3$ $x^3$ of Fig. 1. Fig. 4 is a detail view showing means for locking the pivoted nut-blocks with the coöperating screw-shaft, and Fig. 5 is a detail view looking at the outer end of one of the knife-carrying arms and showing one of the knives applied thereto.

The numeral 1 indicates a table, and the numeral 2 the potatoes.

The numeral 3 indicates a supporting-bracket which is formed with a vertical bearing 4, a horizontal bearing 5, and underturned clamping-lugs 6 and 7. The clamping-lugs 6 and 7 extend at right angles to each other and are provided, respectively, with thumb-screws 8 and 9, that are adapted to clamp the under surface of the edge of the table, as shown in Fig. 1, to firmly hold the supporting-bracket in working position.

A shaft 10, provided with an operating-crank 11 at its outer end and with a beveled gear 12 at its inner end, is journaled to the bearing 5. A long vertical shaft 13, the upper portion of which is threaded, is loosely journaled in the bearing 4 and carries a large spur-gear 14 and a beveled gear 15, which latter meshes with the gear 12. Loosely mounted on the shaft 13 above the gear 14 is a ratchet-toothed platform or table 16, that carries a plurality of vertically-disposed spindles 17, that are loosely journaled therein and are provided at their lower ends with pinions 18, that mesh with the gear 14. The upper ends of the spindles 17 are forked or provided with tines 19, that are adapted to be inserted into the potato or similar article that is to be pared. A retaining-pawl 20, mounted on the bracket 3, engages the teeth of the table 16 to prevent rotation thereof when the shaft 13 is rotated by the crank 11.

A pair of vertically-disposed guide-rods 21 are rigidly secured at their lower ends to the platform or table 16 and at their upper ends are connected by a metallic tie-bar 22, in which the upper end of the screw-shaft 13 is loosely journaled. A vertically-movable head is mounted to slide upon the rods 21. This head is, as shown, made up of three ring-like sections 23, 24, and 25, the lower two of which are connected by a sleeve 26 and by four pins 27. On the pins 27 are loosely pivoted radially-extended arms 28, that are pressed by springs 29, that tend to force the same in the direction of the arrow marked thereon in Fig. 2. At their free ends the arms 28 are provided with U-shaped knives 30, that are adjustably secured thereto by thumb-screws 31. Said arms 28 are also provided at their free ends with heads 32, that are located within the bows of the respective U-shaped knives 30 and serve to limit the depth of the cut of said knives.

Working between the sections 23 and 24 of the vertically-movable head and pivoted thereto at 33 is a pair of jaws or nut-blocks 34, that are formed with threads that engage the threads of the screw shaft or rod 13.

The nut-blocks 34 are closed against the tension of spring 35. (Best shown in Fig. 3.) To the free end of one of the nut-blocks 34 is pivoted a latch-dog 36, adapted to engage with a lug 37 on the free end of the other nut-block to positively hold the two nut-blocks clamped onto the threaded portion of the screw-rod 13.

The machine illustrated is adapted to simultaneously peel four potatoes, said potatoes being applied one to each of the forked spindles or holders 17. The initial or starting positions of the knife-carrying arms 28 are shown in Fig. 1. Under the rotary movement of the operating-crank 11 the several holders or spindles 17 will be rotated in the same direction—to wit, in the direction of the arrows marked in Fig. 2—and under the action of the slow-moving screw-shafts 13 on the nut-blocks 34 the several arms 28 and the block to which they are pivoted will be gradually raised, thereby causing the cutters or knives 30 to travel over the entire surface of the several potatoes. The spring-pressed arms 28 will of course yield, so that the knives will follow all irregularities in the potatoes and will effectually cut out the "eyes" thereof. As already stated, the depth of the cut may be varied by adjustments of the knives with respect to the heads 32 of the respective arms.

When the several block-holders are rotated and the knives are thrown into action, as above described, there is a tendency to rotate the table 16 in the direction of the arrow marked thereon in Fig. 2; but such movement will be resisted by a spring-pressed pawl 20. The said table may, however, be rotated in a reverse direction in order to bring the several forked holders or spindles successively into position in front of the operator.

When the knives have been carried above the potatoes on the several spindles or holders, the several potatoes which have been completely peeled should then be removed. To return the knives to each initial or lowermost position, it is only necessary to raise the lock-dog 36 out of engagement with the lug 37, whereupon the spring 35 will throw the nut-blocks 34 out of engagement with the threads of the screw-shaft 13, as indicated by dotted lines in Fig. 3, and this being done the several knife-carrying arms and the head to which they are pivoted will fall by gravity to their said lowermost positions. Before starting in the paring action the nut-blocks should of course be forced onto the screw-shaft and locked by means of the dog 36.

It will of course be understood that the device is capable of modification within the scope of my invention as herein set forth and claimed.

It will be further understood that the device is well adapted for use in paring apples and various other fruits and vegetables.

What I claim, and desire to secure by Letters Patent of the United States, is as follows:

1. In a paring-machine, the combination with a screw-rod and several rotary holders, of a head mounted to travel on said rod, spring-pressed arms corresponding in number with the several holders pivoted to said head and provided at their ends with knives adapted to follow irregularities of the vegetables being pared, and means for rotating said rod and the several holders, substantially as described.

2. The combination with a rotary table and means for holding the same against rotation, of vertical guides supported by said table, a vertical screw-rod journaled at the axis of said table between said guides, a head mounted to move vertically on said guides, nut-blocks pivoted to said head and engageable with said screw-rod, means for locking said nut-blocks unto said screw-rod and for releasing the same, a plurality of knife-equipped spring-pressed arms carried by said head, a corresponding plurality of holders journaled in said table, and a crank geared to said screw-rod and to the several holders for rotating the same, substantially as described.

In testimony whereof I affix my signature in presence of two witnesses.

OSCAR P. G. RADSCH.

Witnesses:
HERMAN J. BURKE,
F. D. MERCHANT.